Patented Jan. 6, 1942

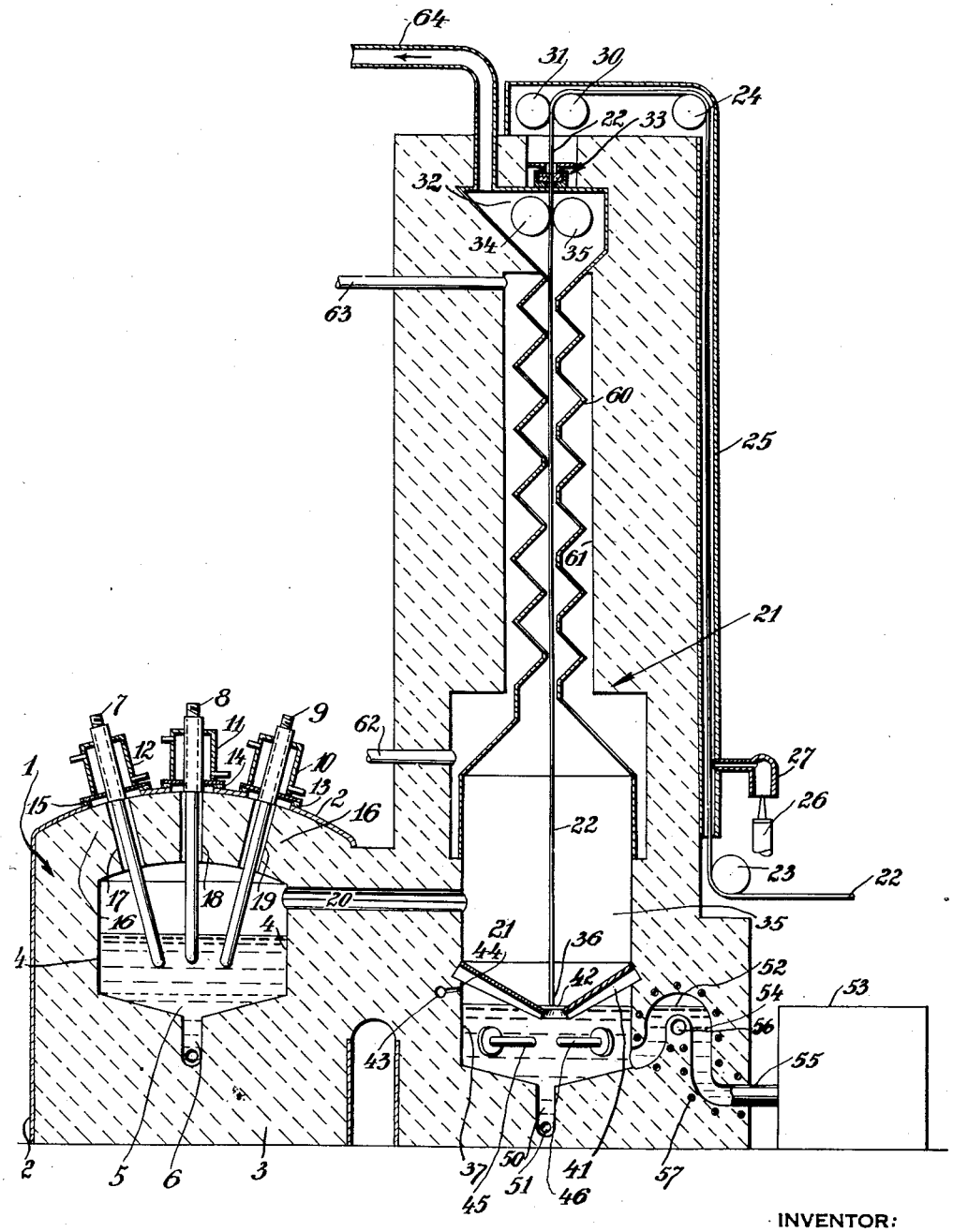

2,268,779

UNITED STATES PATENT OFFICE 2,268,779

METHOD FOR THE RECOVERY OF METALLIC MAGNESIUM FROM MIXTURES OF ELEMENTAL MAGNESIUM AND CARBON MONOXIDE, PRODUCED BY THE CARBONIFEROUS REDUCTION, AT HIGH TEMPERATURES, OF MAGNESIUM OXIDE

William C. Seifert, Narberth, Pa., assignor to Electric Heating Equipment Company, Philadelphia, Pa., a corporation of Delaware Application January 30, 1941, Serial No. 376,602

3 Claims. (Cl. 75—67)

This invention is a new and useful method for the recovery of metallic magnesium from mixtures of elemental magnesium and carbon monoxide, produced by the carboniferous reduction, at high temperatures, of magnesium oxide.

The invention will be understood from the following description read in conjunction with the drawing which is a vertical section through apparatus in which the invention may be carried into effect. The method and apparatus will be conjointly described.

I is an electric furnace comprising the metallic shell 2 and the refractory lining 3. This lining is composed of high temperature resistant refractory material, preferably fused alundum. The lining defines the pit 4, the lower part of which is tapping duct 5 communicating with tapping port 6 formed in the side of shell 2. The furnace is heated by carbon electrodes which depend into the charge. Two electrodes may be employed connected to single phase A. C. current, but in practice I prefer and have shown three electrodes 7, 8 and 9 connected to the leads of a three-phase system through water jacketed electrode holders 10, 11 and 12. These electrode holders are electrically insulated from shell 2 by the insulating washers 13, 14 and 15. They are secured to the shell 2 by studs surrounded by insulating bushings (not shown), so that the electrodes and holders are completely insulated from the shell. Electrodes, moreover, pass through the roof 16 of the furnace through the ducts 17, 18 and 19 so that the electrodes are spaced apart from and thereby suitably insulated from the refractory lining. The charge consisting of magnesium oxide and carbon is passed into the furnace through a suitable charging port (not shown) and is heated therein by the electrical current delivered through the electrodes 7, 8 and 9 to a temperature at which reduction of the magnesium oxide by the carbon takes place and an equilibrium mixture of elemental magnesium in gas phase, together with gaseous carbon monoxide passes at considerable velocity through the outlet duct 20 into the base of tower 21. The base of the tower is composed of refractory material. A roll of magnesium ribbon is fed into the upper part of the tower. This roll 22 is delivered from a suitable reel and runs over the guide rollers 23 and 24. In its upward passage it is shielded by the projecting hood 25 and maintained in an inert atmosphere by combustion products from the gas burner 26 diverted into this hood through the side inlet 27. The rate of feed of the magnesium ribbon is determined by the feed rollers 30 and 31 which are mechanically driven and which engage the ribbon in the bite of the rollers. The ribbon enters the upper part 32 of the tower 21 through a loosely packed stuffing box 33 and is guided into position within the tower by the guide rollers 34 and 35. The ribbon as it is fed passes downwardly within the tower and in the base 35 of the tower contacts the equilibrium mixture of elemental magnesium and carbon monoxide delivered from duct 20. The rate of feed of the magnesium ribbon 22 is sufficient to bring the temperature of the equilibrium mixture down to the point of condensation of the elemental magnesium contained therein, whereupon the lower end 36 of the ribbon progressively melts at least in part and together with the condensed elemental magnesium from the equilibrium mixture runs into and forms part of the pool 37. The elemental magnesium in pool 37 is further protected from contact with the hot incoming equilibrium mixture by the partition 41 spanning the lower part of the base 35 of the tower 21. The partition 41 defines a centrally located orifice 42 through which the fluid metal flows into the pool 37. Inert gas from the duct 43 is injected through tuyère 44 into the lower part of tower 21 beneath the partition 41. This protects the surface of the pool of liquid magnesium beneath the partition 41 and by bubbling up through the magnesium at the orifice 42 further protects that part of the surface of the liquid magnesium that necessarily remains exposed to the equilibrium mixture in the base 35 of tower 21. Electrodes 45 and 46 are provided projecting into the pool so that the pool can be brought to fluid condition when starting up the furnace or, if desired, at the end of a run the metal in pool 37 may be fully withdrawn while still fluid through duct 50 communicating with tapping port 51. During the progress of the run the magnesium running into pool 37 over and above that necessary to maintain the predetermined level 52 runs off into the collector box 53 through the trap 54 and duct 55. The trap 54 is provided with a duct 56 for the circulation of a cooling liquid so that the liquid metal flowing into receptacle 53 can be brought to as low a temperature as is compatible with fluidity. The trap and duct are also provided with an electric heater coil diagrammatically indicated by 57 so that if the operation of the furnace is interrupted, the metal in the trap and duct can be prevented from freezing or can be restored to molten condition in case the same has frozen while the furnace is out of operation. The equilibrium mixture substantially free from elemental magnesium passes upwardly through the tower 21. To facilitate the further cooling of the remaining mixture, the upper part of the tower is so constructed that the mixture is forced to pursue a circuitous and turbulent path, and for this reason the upper part 60 of tower 21 is constructed with a notched cross-section as shown. In the form illustrated any horizontal cross-section through the tower is a rectangle having a depth slightly greater than the width of the magnesium ribbon 22. For further cooling the upper part 60 of the tower is surrounded by cooling jacket 61 supplied with cooling liquid through the duct 62 which overflows and leaves the jacket through outlet 63. The upper water jacketed part of the tower which defines the inner surface of the water jacket is of steel. The cooled carbon monoxide is conducted away from the tower through gas outlet 64.

The foregoing description is by way of illustration and not of limitation, and it is, therefore, my intention that the invention be limited only by the appended claims or their equivalents, in which I have endeavored to claim broadly all inherent novelty.

I claim:

1. Method of separating elemental magnesium from gaseous equilibrium mixtures produced by subjecting magnesium oxide and carbon to a reducing temperature which comprises continuously and downwardly advancing solid magnesium while conducting the equilibrium mixture upwardly and counter-currently in contact therewith the rate of advance being such that a solid magnesium so advanced melts progressively at least in part adjacent its lower end in contact with said equilibrium mixture.

2. Method according to claim 1 in which the solid magnesium is in ribbon form.

3. Method of separating elemental magnesium from gaseous equilibrium mixtures produced by subjecting magnesium oxide and carbon to a reducing temperature which comprises continuously and downwardly advancing solid magnesium while conducting the mixture upwardly and counter-currently in contact therewith, the rate of advance being such that the solid magnesium so advanced melts progressively at least in part adjacent its lower end in contact with said equilibrium mixture maintaining a pool of liquid magnesium adjacent the lower end of the solid magnesium so advanced and protecting such pool from contact with said equilibrium mixture by discharging hydrogen adjacent the same.

WILLIAM C. SEIFERT.